(12) United States Patent
Roberge (10) Patent No.: US 10,837,294 B2
(45) Date of Patent: *Nov. 17, 2020

(54) MULTI-MATERIAL TURBINE AIRFOIL

(71) Applicant: Raytheon Technologies Corporation, Farmington, CT (US)

(72) Inventor: Gary D. Roberge, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 27 days.

This patent is subject to a terminal disclaimer.

(21) Appl. No.: 16/251,308

(22) Filed: Jan. 18, 2019

(65) Prior Publication Data

US 2019/0153877 A1 May 23, 2019

Related U.S. Application Data

(63) Continuation of application No. 15/027,312, filed as application No. PCT/US2014/061916 on Oct. 23, 2014, now Pat. No. 10,221,701.

(Continued)

(51) Int. Cl.
*F01D 5/28* (2006.01)
*F01D 5/14* (2006.01)

(Continued)

(52) U.S. Cl.
CPC ............ *F01D 5/282* (2013.01); *F01D 5/147* (2013.01); *F01D 5/18* (2013.01); *F01D 5/284* (2013.01);

(Continued)

(58) Field of Classification Search
CPC . F01D 5/282; F01D 5/18; F01D 25/12; F01D 25/005; F01D 9/041; F01D 5/147;
(Continued)

(56) References Cited

U.S. PATENT DOCUMENTS 5,263,823 A ‡ 11/1993 Cabaret ................. F01D 11/006
416/218
5,358,379 A ‡ 10/1994 Pepperman ............. B23P 6/005
415/19

(Continued)

OTHER PUBLICATIONS

International Preliminary Report on Patentability for International Application No. PCT/US2014/061916 dated Jun. 2, 2016.‡

(Continued)

*Primary Examiner* — Matthew W Jellett
(74) *Attorney, Agent, or Firm* — Carlson, Gaskey & Olds, P.C.

(57) ABSTRACT

A turbine component comprises a platform and an airfoil extending radially away from the platform and extending from a leading edge to a trailing edge. A leading edge portion defines the leading edge of the airfoil and a trailing edge portion including the trailing edge. One of the leading and trailing edge portions also includes the platform. The leading edge portion is formed of a first material distinct from a second material forming the trailing edge portion. The first material has an operating temperature capability at least 100° F. higher than that of the second material. A gas turbine engine is also disclosed.

19 Claims, 8 Drawing Sheets

Related U.S. Application Data (60) Provisional application No. 61/907,449, filed on Nov. 22, 2013.

(51) Int. Cl.
  *F01D 5/18* (2006.01)
  *F01D 9/04* (2006.01)
  *F01D 25/00* (2006.01)
  *F01D 25/12* (2006.01)
  *F04D 29/32* (2006.01)
  *B23P 15/04* (2006.01)

(52) U.S. Cl.
  CPC ........... *F01D 9/041* (2013.01); *F01D 25/005* (2013.01); *F01D 25/12* (2013.01); *F04D 29/321* (2013.01); *B23P 15/04* (2013.01); *F05D 2220/32* (2013.01); *F05D 2240/303* (2013.01); *F05D 2260/36* (2013.01); *F05D 2300/5023* (2013.01); *F05D 2300/522* (2013.01); *Y02T 50/60* (2013.01)

(58) Field of Classification Search
  CPC .... F01D 5/284; F04D 29/321; F05D 2220/32; F05D 2300/5023; F05D 2300/522; F05D 2240/303; F05D 260/36; Y02T 50/672; B23P 15/04
  See application file for complete search history.

(56) References Cited

U.S. PATENT DOCUMENTS

| | | | | |
|---|---|---|---|---|
| 7,334,997 | B2 ‡ | 2/2008 | Karafillis | F01D 5/16 416/22 |
| 7,972,113 | B1 ‡ | 7/2011 | Davies | F01D 5/025 416/214 A |
| 8,033,790 | B2 ‡ | 10/2011 | Vance | F01D 5/147 416/21 |
| 10,011,892 | B2 * | 7/2018 | Szuromi | C22C 1/02 |
| 2008/0260538 | A1 ‡ | 10/2008 | Wilson | F01D 5/147 416/97 |
| 2010/0124502 | A1 ‡ | 5/2010 | Brandl | F01D 5/147 416/19 |
| 2013/0251536 | A1 ‡ | 9/2013 | Mironets | F01D 5/147 416/22 |
| 2016/0138407 | A1 ‡ | 5/2016 | Freeman | F01D 5/284 416/214 A |
| 2017/0173678 | A1 * | 6/2017 | Wu | B22C 1/02 |
| 2019/0027913 | A1 * | 1/2019 | Sang | B32B 27/08 |

OTHER PUBLICATIONS

Supplementary European Search Report for European Application No. 14879065.2 dated Nov. 6, 2017.‡

\* cited by examiner
‡ imported from a related application

MULTI-MATERIAL TURBINE AIRFOIL

CROSS-REFERENCE TO RELATED APPLICATIONS

This application is a continuation of U.S. application Ser. No. 15/027,312 filed on Apr. 5, 2016, now U.S. Pat. No. 10,221,701 granted Mar. 5, 2019, which is a National Phase of International Application No. PCT/US2014/061916 filed on Oct. 23, 2014, which claims priority to U.S. Provisional Patent Application No. 61/907,449, filed Nov. 22, 2013.

BACKGROUND OF THE INVENTION

This application relates to a turbine airfoil, wherein a leading edge portion is formed of a material having a higher melt point than another portion of the airfoil.

Gas turbine engines are known and, typically, include a fan delivering air into a compressor. The air is compressed and delivered into a combustor section where it is mixed with fuel and ignited. Products of this combustion pass downstream over turbine rotors driving them to rotate.

The turbine rotors carry rotating blades having airfoils, and there are typically several stages of the rotating blades. There are also intermediate rows of vanes which are static and also include airfoils.

The blades and airfoils are subject to very high temperatures from the products of combustion. Designing the airfoils requires a good deal of trade-offs, in that, the airfoils are desirably lightweight, inexpensive and yet able to handle temperature and stress challenges. As an example, a leading edge of the airfoil is typically subject to much higher temperatures than the remainder of the airfoil body. Yet, airfoils have typically been formed of a single material. This has required additional cooling near the leading edge.

Typically, cooling is performed by routing cooling air through the airfoil. The additional cooling load while at the leading edge decreases the efficiency of the overall engine.

SUMMARY OF THE INVENTION

In a featured embodiment, a turbine component comprises a platform and an airfoil extending radially away from the platform and extending from a leading edge to a trailing edge. A leading edge portion defines the leading edge of the airfoil and a trailing edge portion including the trailing edge. One of the leading and trailing edge portions also includes the platform. The leading edge portion is formed of a first material distinct from a second material forming the trailing edge portion. The first material has an operating temperature capability at least 100° F. higher than that of the second material.

In another embodiment according to the previous embodiment, the operating temperature capability is a melt point.

In another embodiment according to any of the previous embodiments, the first material has a melt point at least 300° F. higher than a melt point of the main body portion.

In another embodiment according to any of the previous embodiments, a lock is formed on one of the leading edge portion and the trailing edge portion. The other of the trailing edge portion and the leading edge portion has ears which fit behind the lock to secure one of the leading edge portion to the trailing edge portion.

In another embodiment according to any of the previous embodiments, the trailing edge portion includes the platform.

In another embodiment according to any of the previous embodiments, a cavity for receiving the leading edge portion extends through the platform.

In another embodiment according to any of the previous embodiments, an angled attachment structure is formed on an opposed side of the platform relative to the airfoil. Angled faces on the leading edge portion contact the angled attachment structure.

In another embodiment according to any of the previous embodiments, a lock ring locks the main body portion within the cavity.

In another embodiment according to any of the previous embodiments, the component is a turbine blade and there is a dovetail on the opposed side of the platform from the airfoil. The cavity extends into the dovetail. The main body portion is secured within the cavity in the dovetail.

In another embodiment according to any of the previous embodiments, the leading edge portion includes the platform.

In another embodiment according to any of the previous embodiments, the trailing edge portion is provided with cooling air.

In another embodiment according to any of the previous embodiments, the leading edge portion is provided with cooling air.

In another embodiment according to any of the previous embodiments, the leading edge portion is not provided with cooling air.

In another embodiment according to any of the previous embodiments, the leading edge portion is not provided with cooling air.

In another embodiment according to any of the previous embodiments, the trailing edge portion is not provided with cooling air.

In another embodiment according to any of the previous embodiments, the first material has a density at least 5% greater than a density of the second material.

In another embodiment according to any of the previous embodiments, the first material is more resistant to oxidation than is the second material.

In another featured embodiment, a gas turbine engine comprises a compressor section and a turbine section. The turbine section includes rotating blades and static vanes, with the rotating blades and the static vanes having airfoils. An airfoil of at least one of the rotating blades and the static vanes includes a platform. An airfoil extends radially away from the platform, and from a leading edge to a trailing edge. A leading edge portion defines the leading edge of the airfoil and a trailing edge portion includes the trailing edge. One of the trailing and leading edge portions also includes the platform. The leading edge portion is formed of a first material distinct from a second material forming the main trailing edge portion. The first material has an operating temperature capability at least 100° F. higher than that of the second material.

In another embodiment according to any of the previous embodiments, the operating temperature capability is a melt point.

In another embodiment according to any of the previous embodiments, the first material has a melt point at least 300° F. higher than a melt point of the main body portion.

These and other features may be best understood from the following drawings and specification.

DETAILED DESCRIPTION

Figure 1:
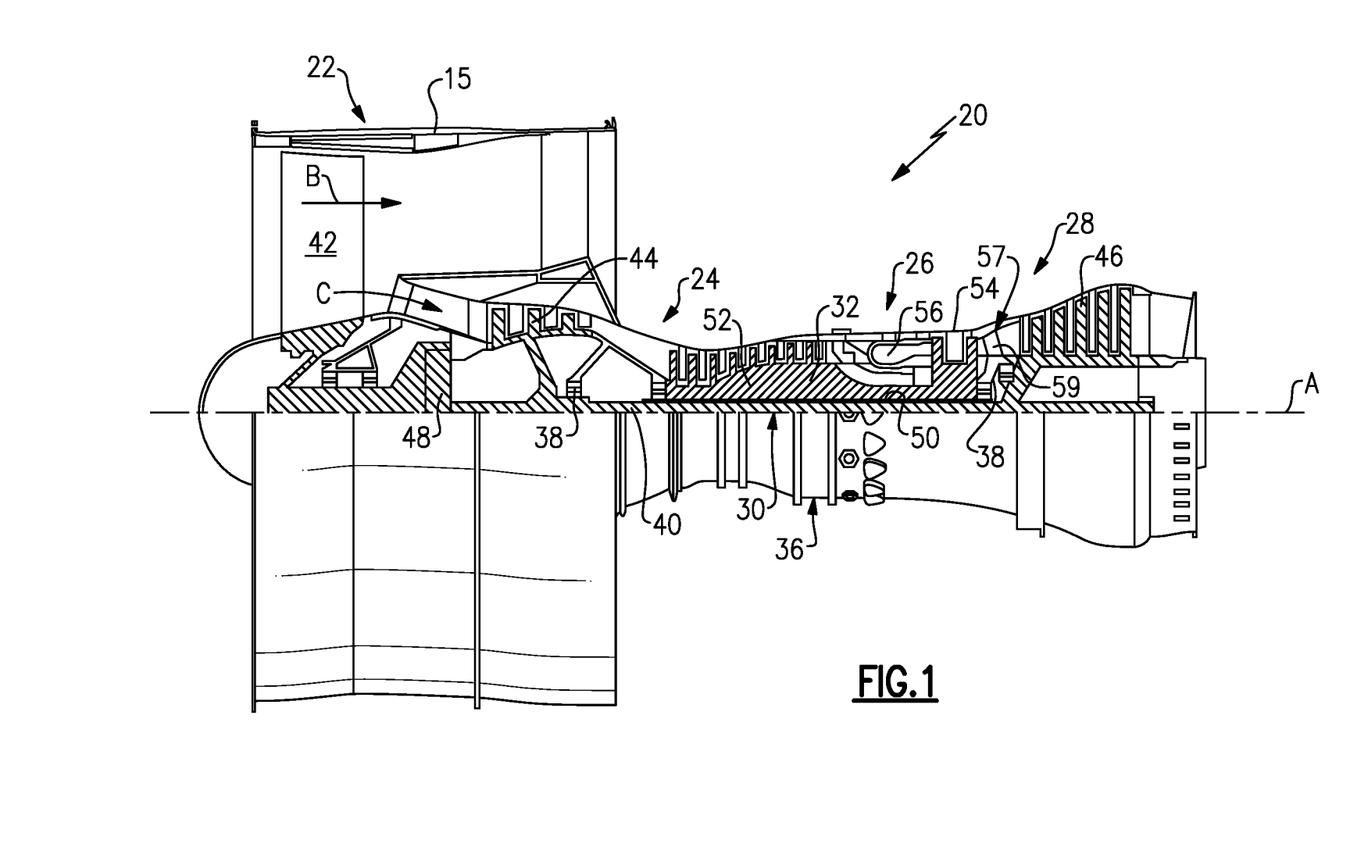
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7\ °R)]^{0.5}$. The "Low corrected fan tip speed" as disclosed herein according to one non-limiting embodiment is less than about 1150 ft/second.

Figure 2:
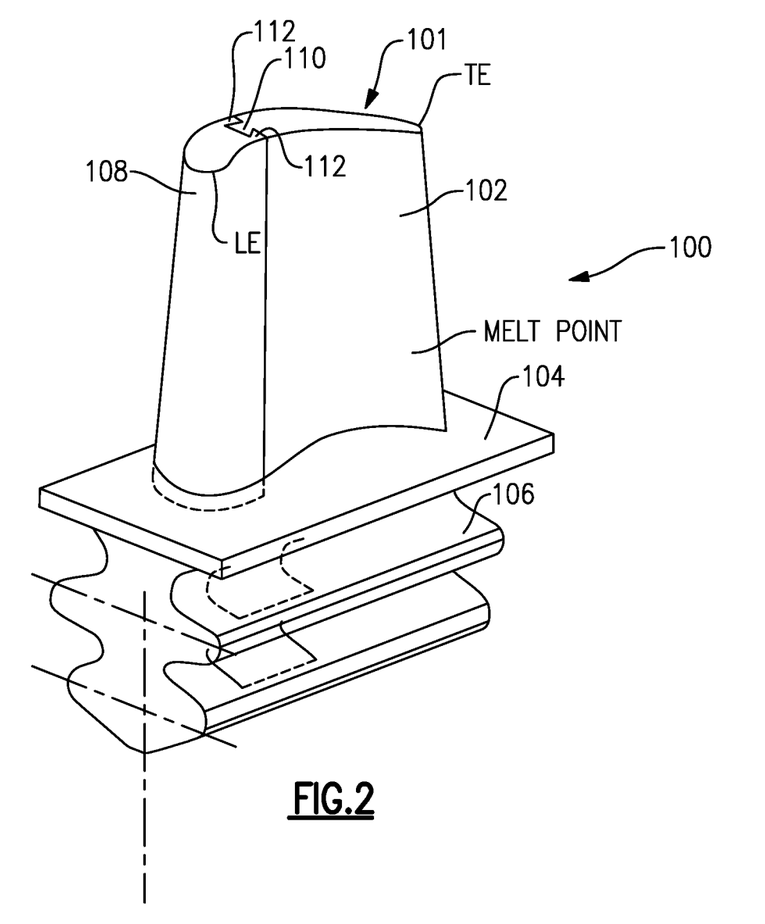
FIG. 2 shows an inventive turbine component.

FIG. 2 shows a turbine blade 100 which may be mounted into a turbine rotor in a gas turbine engine such as engine 20 of FIG. 1. Alternatively, the teachings of this application can extend to static vanes in a turbine section.

As known, an airfoil 101 extends from a platform 104. The airfoil 101 has an airfoil main body portion 102 formed of a common material with the platform 104. In this embodiment, there is also a dovetail portion 106 which will mount the component 100 in a turbine rotor. When the teachings of this application are utilized in a vane, there may not be a dovetail portion, but there will typically be at least one platform and airfoil.

A leading edge 108 portion is mounted adjacent a leading edge of the airfoil 101. As known, the airfoil 101 extends from a leading edge LE to a trailing edge TE.

The leading edge faces higher temperature challenges than does the remainder of the airfoil body.

The leading edge portion 108 is formed of a distinct material from the material forming the main body portion 102/104/106. In one embodiment, the material for forming the leading edge portion has a melt point which is at least 100° F. higher than the melt point of the material forming the main body 102/104/106. In embodiments, the melt point will be at least 300° F. higher.

While the melt point is the disclosed reference point, other ways of defining an operating temperature capability of a material may be utilized to define a 100° F., and more narrowly a 300° F., operating temperature capability difference. As an example, particularly if one of the materials is ceramic or a composite, the operating temperature capability may be the better reference point.

One example may be that the specific strength at a maximum operating temperature could be utilized. Further, the oxidation, or outgassing, or evaporation temperature, a point where a ceramic material or element begins to sublimate or decompose with increased temperature, may be utilized as the temperature capability. Further, a temperature at which fiber softening or loss of fiber tensile strength can occur for ceramic matrix composite materials, may be utilized. Further, a matrix and/or fiber weakening temperature at which there would be increased oxidation, loss of creep resistance, strain as a function of loading combined with time at the temperature, or any number of other temperatures may be relied upon.

Any number of materials can be utilized for the leading edge portion 108. The materials may include refractory alloys, examples may be molybdenum based, niobium based, NiAl alloys. In addition, Sic/Sic or other ceramic matrix composites, monolithic SSI3N4 $Si_3N_4$ or other high temperature ceramics could be utilized. In addition, advanced nickel based alloys may be utilized.

The main body 102/104/106 may be formed of cast or wrought super alloys or other high temperature metallic or non-metallic materials.

Figure 3:
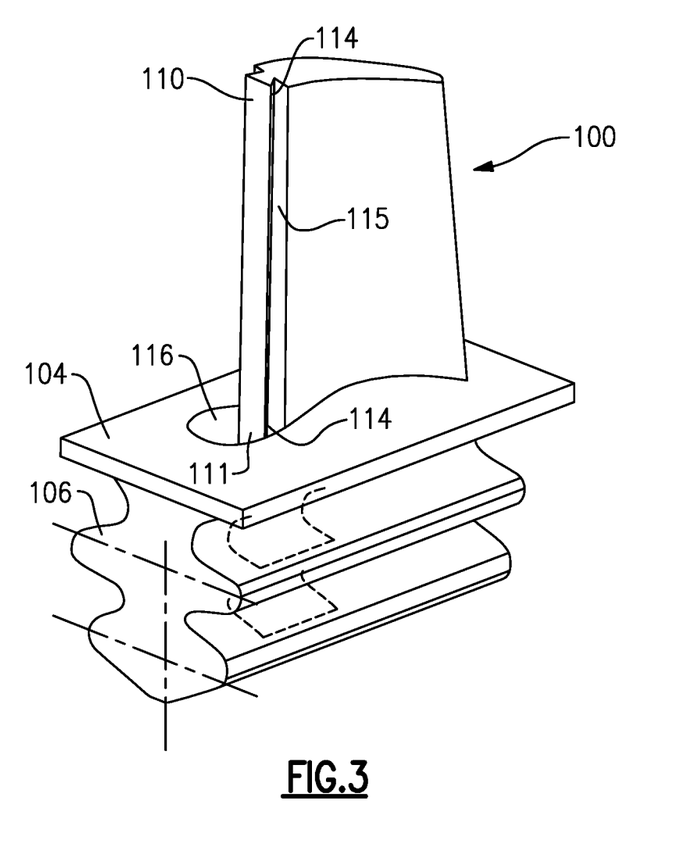
FIG. 3 shows a view of one portion of the FIG. 2 component.

As shown, a generally trapezoidal lock 110 fits within a groove formed by ears 112 to secure the leading edge portion 108 on the main body portion 102/104/106. The attachment rail show in is one example and it is recognized that others skilled in the art may define alternate attachment concepts FIG. 3 shows a cavity 116 extending through the platform 104 and shows further details of the trapezoidal lock 110. As shown, there are angled sides 114 which extend outwardly from a forward face 115 and expands at an angle such that the lock 110 has a greater width at a remote end 111 than it does as it origin at the face 115.

Figure 4A:
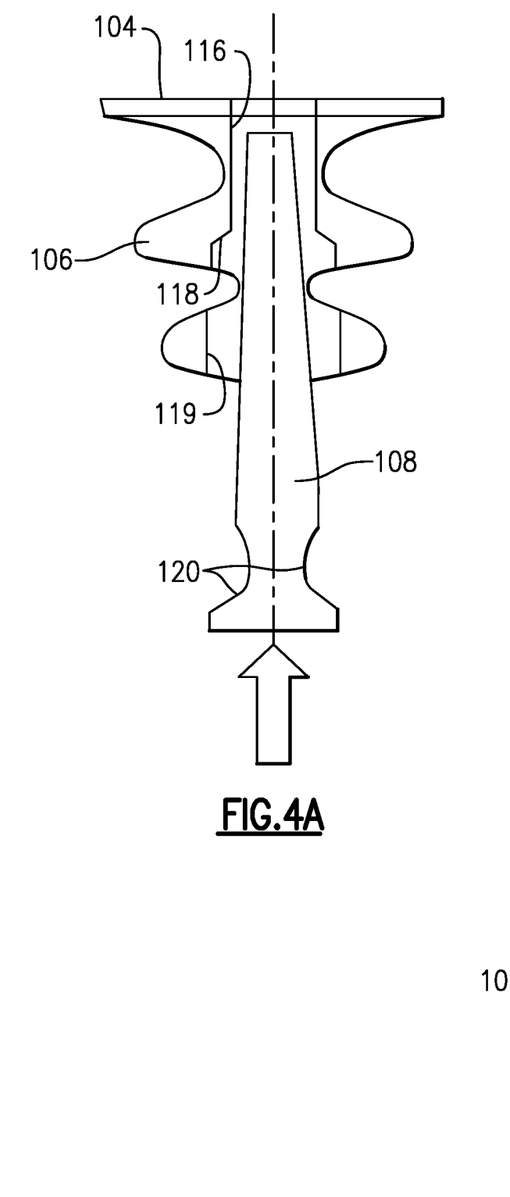
FIG. 4A shows a first assembly step.

FIG. 4A shows the leading edge portion 108 being inserted through an opening 119 at a radially inner end of the dovetail 106. An attachment face 118 is angled and formed in cavity 116.

Figure 4B:
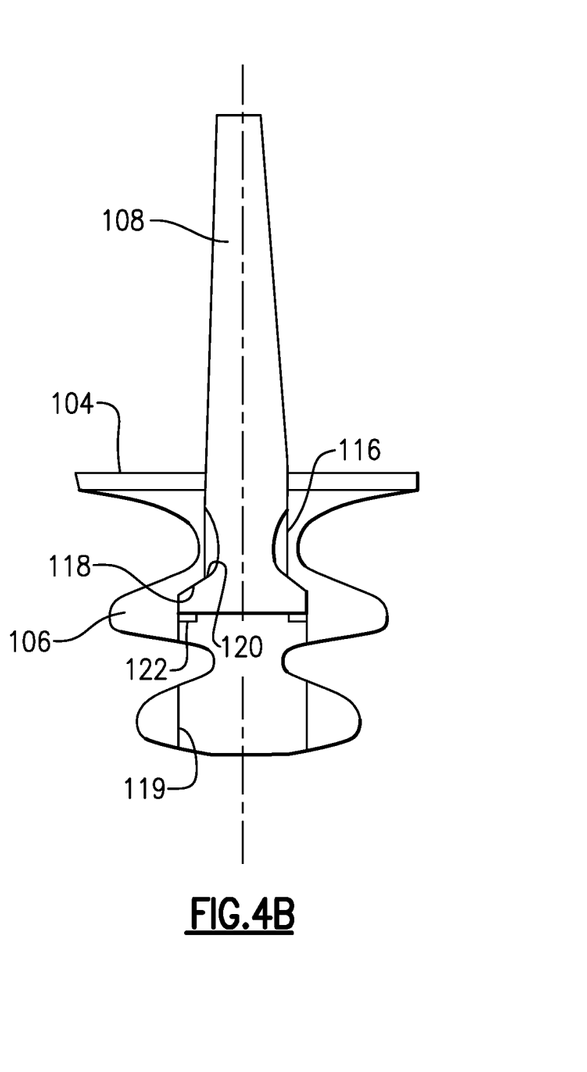
FIG. 4B shows a second assembly step.

FIG. 4B shows the leading portion 108 fully assembled and having angled faces 120 which abut the angled faces of attachment face 118. A snap ring 122 or other securement feature secures the leading edge portion 108 within the cavity 116. Although not shown here, the lock 110 also fits between the ears 112.

The angled attachment face or structure 118 is formed on an opposed side of platform 104 relative to airfoil 102. Angled faces 120 on leading edge portion 180 are in contact with angled attachment structure 118.

Figure 5A:
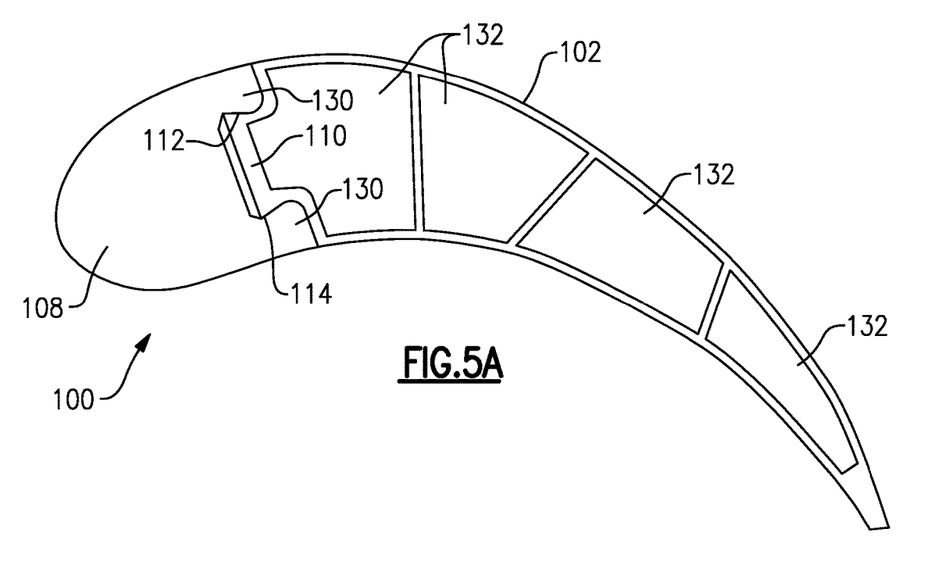
FIG. 5A shows a first option.

FIG. 5A is a cross-sectional view showing the component 100. As shown, the leading edge portion 108 may be generally solid and may not require air cooling. On the hand, it could also be hollow and not be air cooled. As shown, an ear 130 extend laterally towards an opposed ear 130, such that they lock around the sides 114 of the lock 110. It should be understood that the trapezoidal lock 110 could be formed on the leading edge portion 108 with the ears 112 formed on the main body portion 102.

Figure 5B:
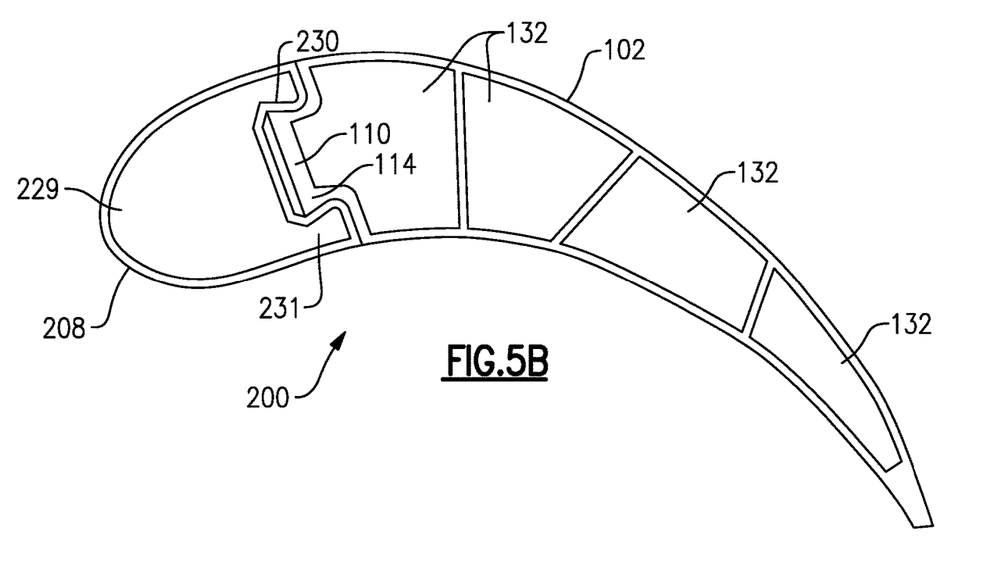
FIG. 5B shows a second option.

In this embodiment, cooling cavities 132 are formed within the main body portion 102. Cavities 132 are supplied with cooling air, as shown FIG. 5B shows another option 200. Here, the main body 102 is provided with cooling cavities 132. In addition, a leading edge portion 208 is provided with a cooling cavity 229 and cooling cavity 229 has cooling extensions 231 extending into the ears 230. That is, the ears 230 may be thin walled such that cooling can occur within the ears also. Again, air is supplied to cavity 229.

Figure 5C:
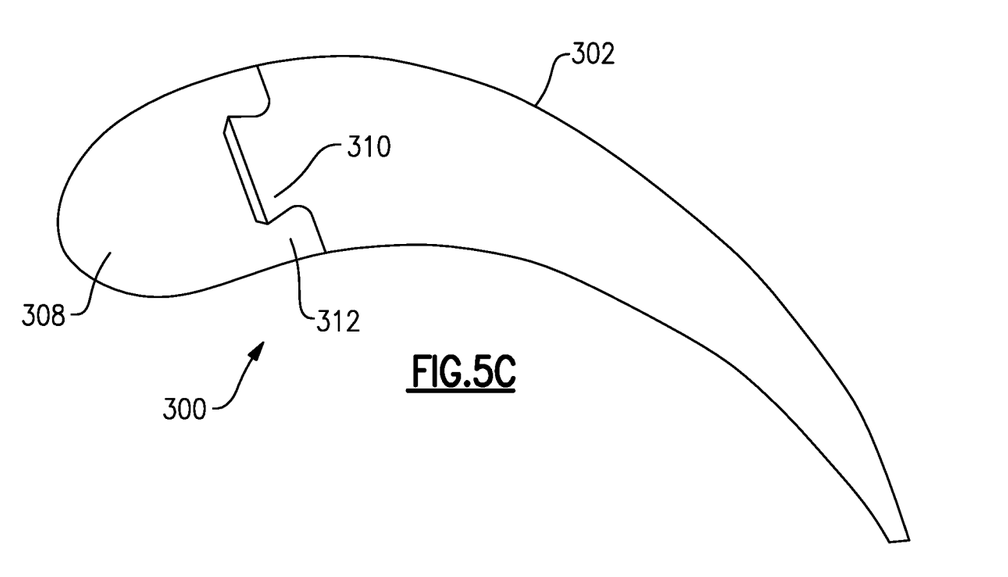
FIG. 5C shows a third option.

FIG. 5C shows another embodiment 300. Here, neither the leading edge portion 308 or the main body portion 302 are air cooled. Again, while they are both shown as solid in this embodiment, they could also be hollow. The lock 310 is shown fitted within the ears 312.

Figure 5D:
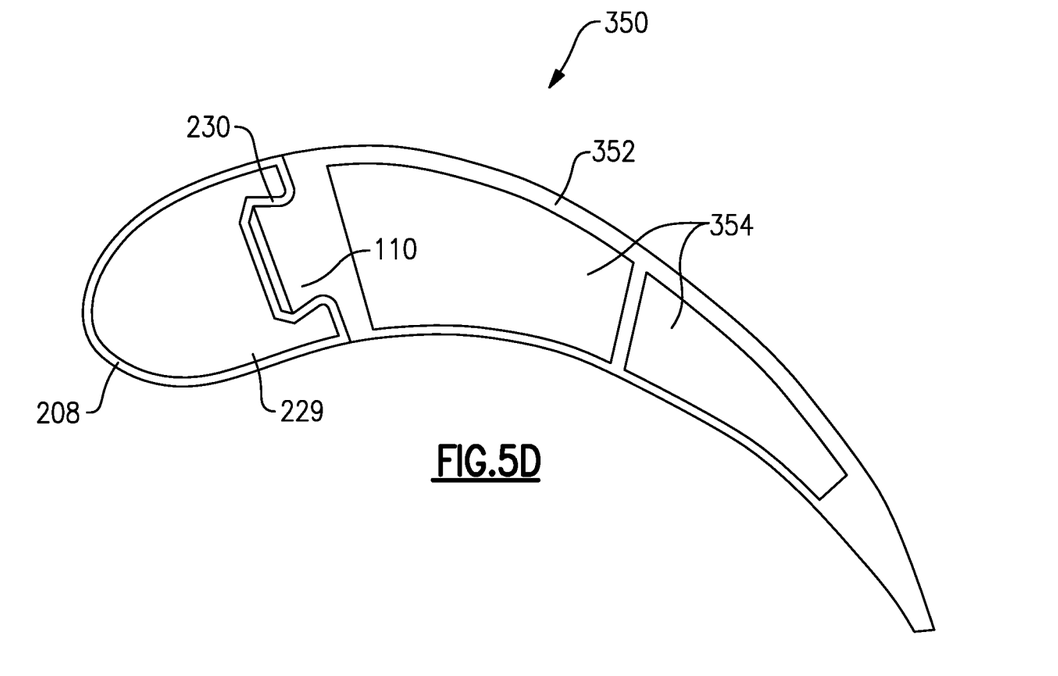
FIG. 5D shows yet another option.

FIG. 5D shows yet another embodiment 350. Here, the leading edge portion 308 is provided with a cooling channel 229 while the main body portion 352 is not provided with air cooling. However, it is provided with hollows 354.

While the earlier embodiments show a main body portion including the trailing edge, and a separate leading edge portion, the opposite could also be true. That is the leading edge could be formed with the platform and the dovetail. The trailing edge portion could be the separate removable portion.

Figure 6:
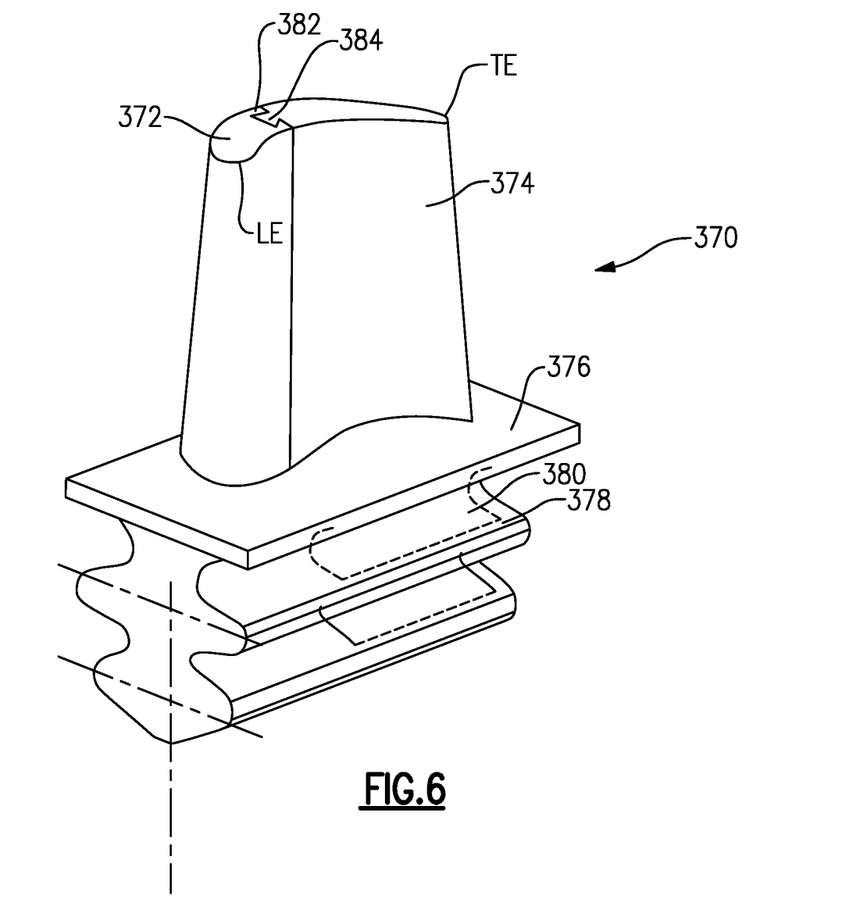
FIG. 6 shows an alternative embodiment.

As an example, FIG. 6 shows an embodiment 370 having the leading edge portion 372 of the airfoil formed as an integral part with the platform 376 and the dovetail 378. A separate trailing edge portion 374 is shown. A lock 384 is formed on the trailing edge portion, and the ears 382 are formed on the leading edge.

Figure 7:
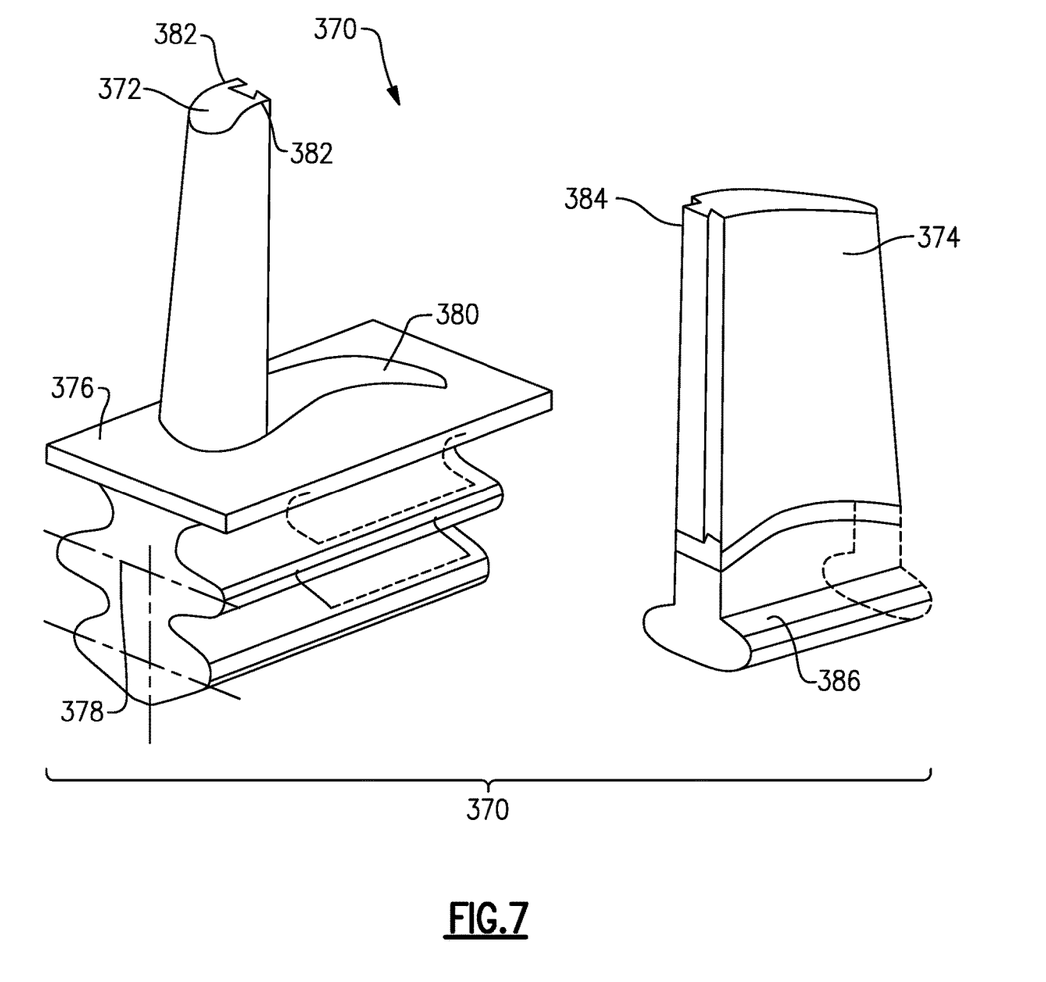
FIG. 7 shows the FIG. 6 embodiment in an exploded view.

As shown in FIG. 7, the trailing edge portion 374 has angled surfaces 386 that may be secured within a cavity 380 similar to the prior embodiment. In this embodiment, the trailing edge portion 372 would be formed of a material distinct from the material forming the main body portion 372/376/378. The melting point for the leading edge or main body portion 372/376/378 would be similar to that of the leading edge portion of the earlier embodiment, as would the melt points of the trailing edge portion 374 be similar to the melt point of the main body portion of the earlier embodiment.

In addition, the material forming the leading edge in any embodiment can be higher density than the portion forming the trailing edge, and have greater resistance to oxidation or other environmental conditions. As an example, the material forming the trailing edge may have a density that is at least 5% lower from the density of the portion forming the leading edge. In addition, the portion forming the leading edge can be 10% or more resistant to oxidation than the portion forming the trailing edge.

It should also be understood that the cooling alternatives of FIGS. 5A-5D would also apply to the FIGS. 6 and 7 embodiment.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A turbine component comprising:
   a platform and an airfoil extending radially away from said platform, said airfoil extending from a leading edge to a trailing edge; and
   a leading edge portion defining said leading edge of said airfoil and a trailing edge portion including said trailing edge, said leading edge portion also including said platform, and said leading edge portion being formed of a first material distinct from a second material forming said trailing edge portion, with said first material having an operating temperature capability at least 100° F. higher than that of said second material;

wherein a lock is formed on one of said leading edge portion and said trailing edge portion, and the other of said trailing edge portion and said leading edge portion having ears which fit behind said lock to secure said one of said leading edge portion to said trailing edge portion;

wherein a cavity for receiving said trailing edge portion extends through the platform; and wherein an angled attachment surface is formed on an opposed side of said platform relative to said airfoil and angled surfaces on said trailing edge portion contact said angled attachment structure.

2. The turbine component as set forth in claim 1, wherein said operating temperature capability is a melt point.

3. The turbine component as set forth in claim 2, wherein said first material has a melt point at least 300° F. higher than a melt point of said main body portion.

4. The turbine component as set forth in claim 1, wherein said trailing edge portion includes said platform.

5. The turbine component as set forth in claim 1, wherein a lock ring locks said trailing edge portion within said cavity.

6. The turbine component as set forth in claim 1, wherein said component is a turbine blade and there is a dovetail on said opposed side of said platform from said airfoil with said cavity extending into said dovetail, and said trailing edge portion secured within said cavity in said dovetail.

7. The turbine component as set forth in claim 1, wherein said trailing edge portion is provided with cooling air.

8. The turbine component as set forth in claim 7, wherein said leading edge portion is provided with cooling air.

9. The turbine component as set forth in claim 7, wherein said leading edge portion is not provided with cooling air.

10. The turbine component as set forth in claim 1, wherein said leading edge portion is not provided with cooling air.

11. The turbine component as set forth in claim 10, wherein said trailing edge portion is not provided with cooling air.

12. The turbine component as set forth in claim 1, wherein said first material having a density at least 5% greater than a density of said second material.

13. The turbine component as set forth in clam 1, wherein said first material is more resistant to oxidation than is said second material.

14. A gas turbine engine comprising:

a compressor section and a turbine section, said turbine section including rotating blades and static vanes, with said rotating blades and said static vanes having airfoils;

an airfoil of at least one of said rotating blades and said static vanes including a platform and an airfoil extending radially away from said platform, said airfoil extending from a leading edge to a trailing edge, and a leading edge portion defining said leading edge of said airfoil and a trailing edge portion including said trailing edge, leading edge portion also including said platform, said leading edge portion being formed of a first material distinct from a second material forming said main trailing edge portion, with said first material having an operating temperature capability at least 100° F. higher than that of said second material;

wherein a lock is formed on one of said leading edge portion and said trailing edge portion, and the other of said trailing edge portion and said leading edge portion having ears which fit behind said lock to secure said one of said leading edge portion to said trailing edge portion;

wherein a cavity for receiving said trailing edge portion extends through the platform; and wherein an angled attachment surface is formed on an opposed side of said platform relative to said airfoil and angled surfaces on said trailing edge portion contact said angled attachment structure.

15. The gas turbine engine as set forth in claim 14, wherein said operating temperature capability is a melt point.

16. The gas turbine engine as set forth in claim 15, wherein said first material has a melt point at least 300° F. higher than a melt point said main body portion.

17. A turbine component comprising:

a platform and an airfoil extending radially away from said platform, said airfoil extending from a leading edge to a trailing edge;

a leading edge portion defining said leading edge of said airfoil and a trailing edge portion including said trailing edge, one of said leading and trailing edge portion also including said platform, and said leading edge portion being formed of a first material distinct from a second material forming said trailing edge portion, with said first material having an operating temperature capability at least 100° F. higher than that of said second material;

wherein a cavity receiving one of said leading and trailing edge portions extends through said platform; and wherein an angled attachment structure is formed on an opposed side of said platform relative to said airfoil and angled faces on said one of said leading and trailing edge portions contact said angled attachment structure.

18. The turbine component as set forth in claim 17, wherein a lock ring locks said one of said leading and trailing edge portions within said cavity.

19. The turbine component as set forth in claim 17, wherein said component is a turbine blade and there is a dovetail on said opposed side of said platform from said airfoil with said cavity extending into said dovetail, and said one of said leading and trailing edge portions secured within said cavity in said dovetail.

* * * * *